Feb. 28, 1967   G. M. HUNT   3,306,258
SMALL ANIMAL SHIPPING CAGE
Filed Oct. 5, 1965

INVENTOR.
GUILBERT M. HUNT
By Donald G. Dalton
Attorney

United States Patent Office 3,306,258
Patented Feb. 28, 1967

3,306,258
SMALL ANIMAL SHIPPING CAGE
Guilbert M. Hunt, Brecksville, Ohio, assignor to United States Steel Corporation, Pittsburgh, Pa., a corporation of Delaware
Filed Oct. 5, 1965, Ser. No. 493,082
3 Claims. (Cl. 119—19)

This invention relates to a shipping cage for small animals, for example laboratory animals such as mice, rats, and hamsters.

In external layout, it is designed to permit ventilation, even when closely stacked. Also, the design lends itself to ready incorporation into multiple compartment modular construction for rapid handling of composite multiple units. The preferred embodiment employs, for the main body, conventional double faced corrugated cardboard, such as is generally employed for like sized cartons for other purposes, which cardboard carries a laminate of tin coated steel foil on its inner surface. The foil, while affording other advantages, is primarily to provide a chew-proof barrier. Screened faces are fitted for ventilation, and vented spacing members, out of access to the animals, are provided to insure ventilation in close stacking.

In the past, shipping cages for this purpose have been made from wood, and wire screen. Such cages did not generally foil the chewing propensities of the aforementioned laboratory animals. Also, they were not adapted to unitized construction for assembly into multi-compartment cages.

The cages of the present invention are exceptionally light weight and may be conveniently shipped to prospective animal suppliers in compact knocked-down form, for ready on-site assembly. The cages are of inexpensive construction, and may be discarded when the animals reach their destination, thus avoiding the sanitation and return shipping problems attending reusable cages.

Also, the cages lend themselves to multi-tier assembly, in any desired number of compartments, which facilitates orderly organization of animals for shipment, and simplifies cage handling, since a group of cages may be handled as a unit.

An illustrative example of the invention is further described in conjunction with the drawings, wherein.

Figure 1:
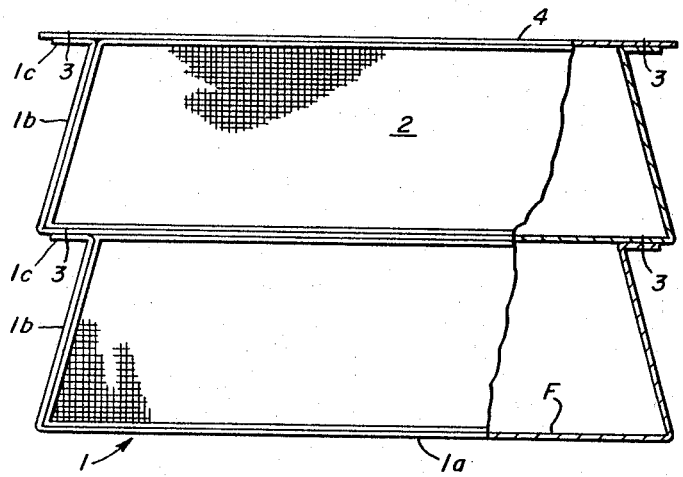
FIGURE 1 is a front elevation showing a two compartment assembly.
Figure 2:
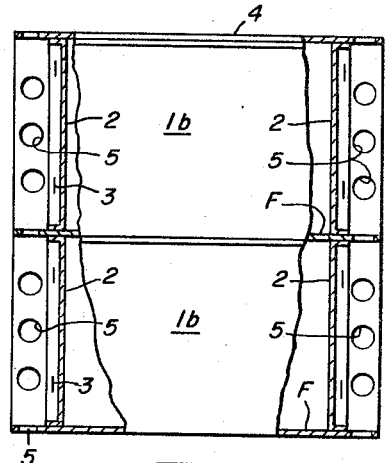
FIGURE 2 is an end elevation of the structure of FIGURE 1.
Figure 3:
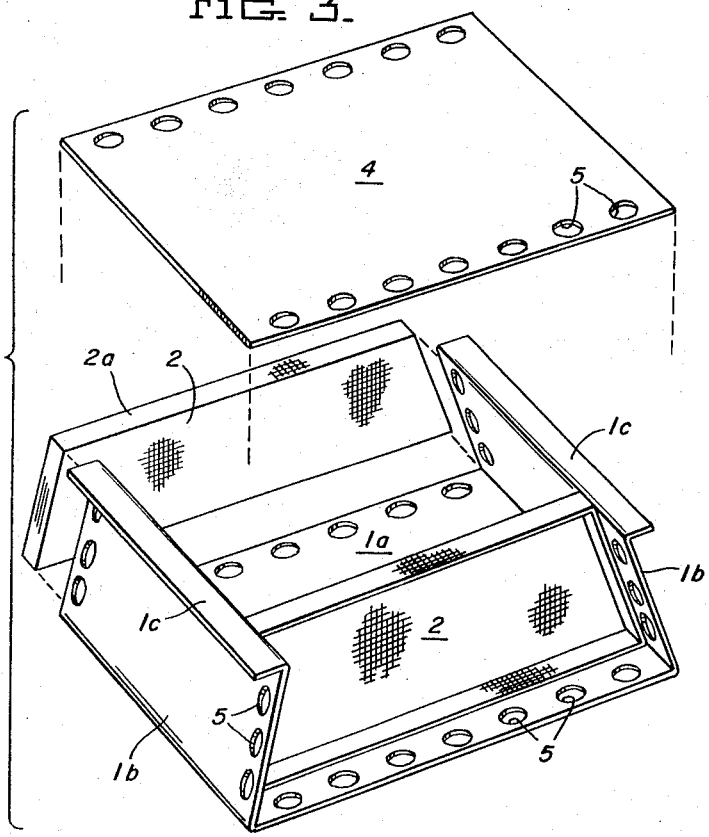
FIGURE 3 is an exploded perspective of a single cage.
Figure 4:
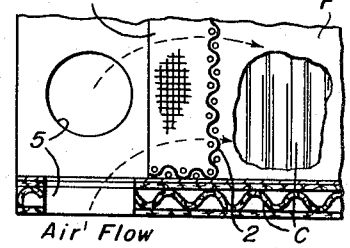
FIGURE 4 is a fragmental enlargement, in section, of a corner of the cage.
Figure 5:
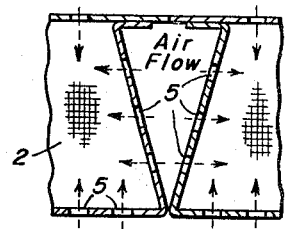
FIGURE 5 illustrates the ventilation air flow pattern with cages abutting end-to-end.
Figure 6:
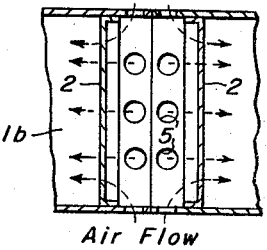
FIGURE 6 illustrates the ventilation air flow pattern with cages abutting face-to-face.

Each of the cage modules depicted in the drawings comprises an initially flat piece of steel-foil faced corrugated board, generally designated 1, which is conventionally creased for bending to form a bottom 1a, sides 1b extending upwardly therefrom, and outwardly extending flanges 1c, at the upper reaches of the sides. Foil laminate f covers the inner surface of the corrugated board. Corrugations c, for maximum strength, are oriented to run vertically at the sides.

Front and rear screens 2, having outwardly extending flanges 2a complete the sides of each cage unit.

It will be noted that sides 1b incline inwardly sufficiently to permit flanges 1c to engage bottom 1a of a superposed unit, without protrusion and so as to permit ready attachment.

In a specific example, the corrugated board was laminated, by conventional adhesives, with tin-coated steel foil of about 0.002 inch thickness. The screens were of galvanized steel of about ⅛ inch mesh, with sufficient strength to impart rigidity to the unit, against collapsing.

These materials were used to construct modular cage units about 18 inches long, six inches high, and 8 inches deep.

Flanges 1c, for the above mentioned unit, were about 1½ inches wide. In assembling the multiple units, which of course may be more than the two depicted, staples 3 are conveniently employed for joining the units. The outer edges of the flanges are proximate to the outer edges of bottom 1a.

If cover 4, rather than another cage is to provide the top for a unit, it may be similarly stapled in place.

Screens 2 are stapled in place, by staples 3, through flanges 2a.

In order to insure ventilation for the animals, under conditions of close packing of containers, bottom 1a and sides 1b of each unit extend outwardly from the screen faces, in the example cited, about 1½ inches. Also, cover 4 has a similar overhang. The extensions, beyond the faces of screens 2, are shown as provided with a series of ventilation holes 5. However, other forms of cut-out may be provided.

The example is to be considered illustrative, to facilitate ready practice of the invention, and not as limiting its scope.

I claim:

1. A shipping cage for small animals comprising a generally imperforate bottom member, two inwardly and upwardly sloping sides, of similar imperforate material, extending thereabove, outwardly extending flanges at the tops of said sides, a generally imperforate cover structure engaging said flanges, two screen sides having flanges for attachment to the said bottom, sides, and cover, said screens being disposed inboard of the outer edges of the generally imperforate bottom, sides, and cover, and vent means located outboard of said screens, in the bottom, side, and cover members extending therebeyond.

2. The cage of claim 1 in which the generally imperforate members are double faced corrugated paper board, laminated on one side with steel foil, with said corrugations oriented to run vertically at the sides.

3. The cage of claim 1 in which the cover structure is the bottom of a similar cage, thereby forming a multiple unit.

References Cited by the Examiner

UNITED STATES PATENTS

| 2,026,417 | 12/1935 | Conway et al. | 119—19 |
| 2,079,458 | 5/1937 | Liechfuss | 220—7 |
| 2,285,053 | 6/1942 | Rojas | 156—322 |
| 2,679,348 | 5/1954 | Tichenor | 229—15 |
| 2,943,965 | 7/1960 | Stogre | 161—137 X |
| 3,040,954 | 6/1962 | Salmon | 229—6 X |
| 3,126,867 | 3/1964 | Kundikoff | 119—19 |

SAMUEL KOREN, *Primary Examiner.*
ALDRICH F. MEDBERY, *Examiner.*